(12) United States Patent  (10) Patent No.: US 7,852,623 B2
Lu  (45) Date of Patent: Dec. 14, 2010

(54) FIXING DEVICE AND COMPUTER (75) Inventor: Kuan-Hsun Lu, Taipei Hsien (TW)

(73) Assignee: Wistron Corporation, Taipei Hsin (TW)

( * ) Notice: Subject to any disclaimer, the term of this patent is extended or adjusted under 35 U.S.C. 154(b) by 141 days.

(21) Appl. No.: 12/222,391

(22) Filed: Aug. 8, 2008

(65) Prior Publication Data
US 2009/0147466 A1 Jun. 11, 2009

(30) Foreign Application Priority Data
Dec. 10, 2007 (TW) ............................. 96220962 U (51) Int. Cl.
H05K 7/20 (2006.01)
(52) U.S. Cl. .................. 361/679.48; 361/695
(58) Field of Classification Search ............ 361/679.48, 361/695
See application file for complete search history.

(56) References Cited

U.S. PATENT DOCUMENTS 5,544,006 A * 8/1996 Radloff et al. ......... 361/679.32
6,735,079 B2 * 5/2004 Huang .................. 361/695
2002/0093797 A1 * 7/2002 Willis et al. ............ 361/752
2003/0016496 A1 * 1/2003 Kim et al. .............. 361/695
2003/0016515 A1 * 1/2003 Jackson et al. .......... 361/796
2004/0062013 A1 * 4/2004 Kim et al. .............. 361/752
2004/0190246 A1 * 9/2004 Arbogast et al. ......... 361/695
2004/0233643 A1 * 11/2004 Bolich et al. ........... 361/727
2004/0257767 A1 * 12/2004 Wang .................. 361/695

FOREIGN PATENT DOCUMENTS

TW        528180        4/2003

* cited by examiner

Primary Examiner—Anatoly Vortman
(74) Attorney, Agent, or Firm—Bacon & Thomas, PLLC (57) ABSTRACT The fixing device of the invention comprises a fan containing portion and at least one interface card fixing element wherein the fan containing portion can be connected to the fan, the interface fixing element comprising a first guiding portion, a second guiding portion and an against element, the first guiding portion and the second guiding portion forming a guiding slot for the interface card sliding into it; and the against element can press against the interface card.

33 Claims, 10 Drawing Sheets

FIXING DEVICE AND COMPUTER

BACKGROUND OF THE INVENTION

1. Field of the Invention

The present invention relates to a computer and a fixing device thereof. It is particularly a computer and a fixing device capable of fixing an interface card and a fan.

2. Description of the Related Art

With the increasing demand of computer efficiency, many functions are achieved by adding interface cards. When many interface cards arranged side by side operate at the same time, the environmental temperature of the interface cards increases greatly due to heat generation. Therefore, the problem of heat dissipation becomes an important issue. One solution is to install a cooling fan. When the end of the interface cards has a cooling fan to lower the temperature of the interface cards and the surrounding area, an exclusive fixing device is needed to fasten the fixing device, the interface cards, and the fan to each other.

In the prior art, there are individually a fan fixing structure and an interface card fixing structure to achieve the function of installing a fan in position. However, the complicated structure requires high manufacturing cost, and it is inconvenient for a user to install it.

In the prior art, although there is a fixing device capable of fixing a fan and an interface card with a single structure, it is large in volume, occupying much interior space of the computer case. In addition, many other matching components (such as an iron piece, screws, etc.) are required. Furthermore, the structural strength of the fixing device is weak, so it is still inconvenient for use.

Therefore, it is desirable to provide a computer and a fixing device that can fix an interface card and a fan with a single fixing device to mitigate and/or obviate the aforementioned problems.

SUMMARY OF THE INVENTION

A main objective of the present invention is to provide a fixing device for installing an interface card and a fan.

Another objective of the present invention is to provide a computer with a fixing device for installing an interface card and a fan.

In order to achieve the main objective, a computer of the invention comprises a case, a fixing device, an interface card, and a fan, wherein the fixing device is connected to the case; one side of the interface card is connected to the fixing device, and another side of the interface card is connected to the case; and the fan is connected to the fixing device.

The fixing device comprises a fan containing portion, with at least one interface card fixing element wherein the fan containing portion can be connected to the fan; the interface fixing element comprises a first guiding portion, a second guiding portion, and a pressing element, the first guiding portion and the second guiding portion forming a guiding slot for the interface card sliding into it; and the pressing element can press against the interface card.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
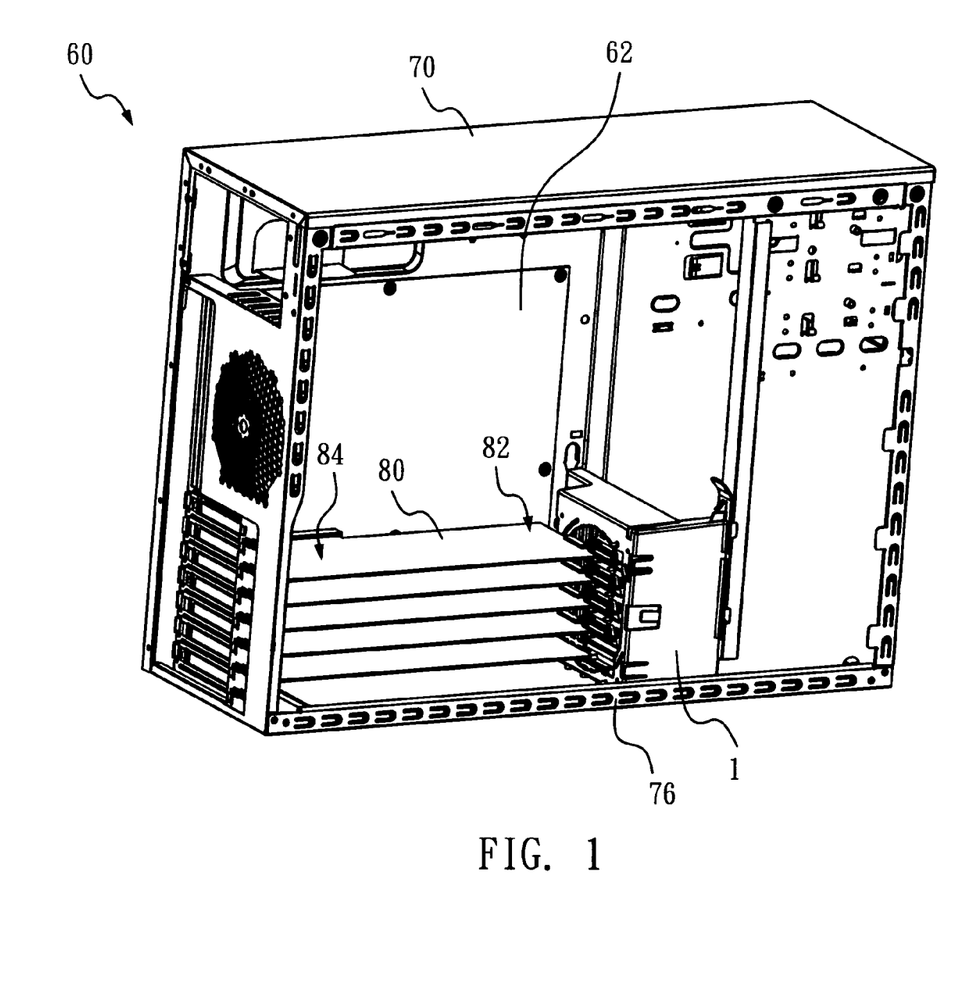
FIG. 1 is a three-dimensional view of a computer of the invention.
Figure 2:
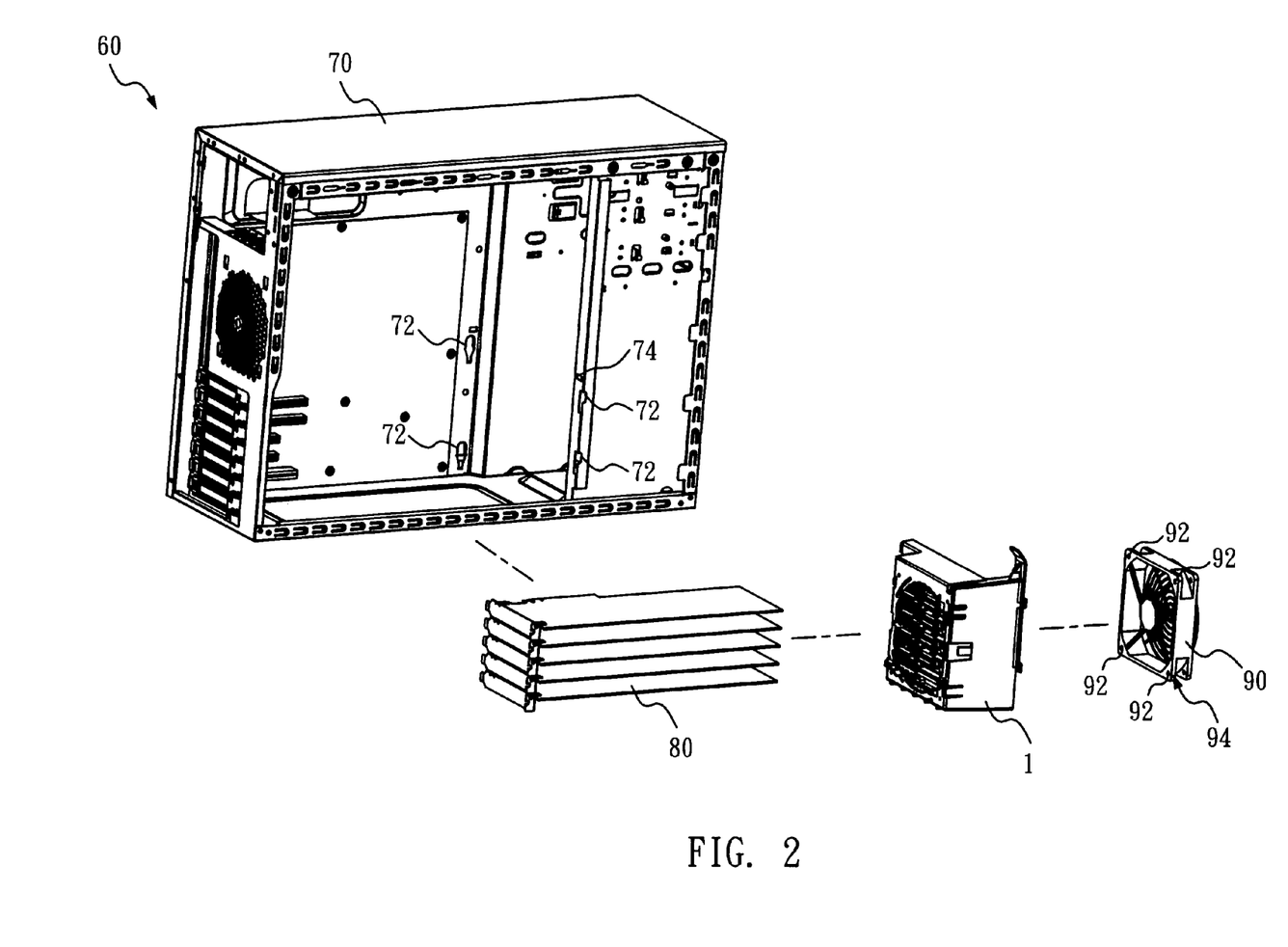
FIG. 2 is an exploded drawing of a computer of the invention.

FIG. 1 and FIG. 2 illustrate the computer with the invention. FIG. 1 is a three-dimensional view of a computer with the invention. FIG. 2 is an exploded drawing of a computer with the invention. The computer 60 of the invention comprises a case 70, a fixing device 1, an interface card 80, and a fan 90. In this embodiment of the invention, the computer 60 is a server.

The case 70 is a frame structure for containing and supporting each component. The fixing device 1 of the invention connects to the case 70. In order to make the fixing device 1 connect to the case 70, the case 70 has a fixing hole 72 and an aperture 74 (as shown in FIG. 2) for connecting the fixing device 1.

In this embodiment of the invention, the interface card 80 is a peripheral component interconnect (PCI) card. One side 82 of the interface card 80 is connected to the fixing device 1, and another side 84 is connected to the case 70 (as shown in FIG. 1). By positioning the fixing device 1, one side 82 of the interface card 80 resists gravity, and it prevents vibration of one side 82 of the interface card 80 when the computer 60 operates.

The fan 90 is contained in the fixing device 1. The fan 90 and the interface card 80 are located on the two opposite sides of the fixing device 1. The airflow produced by the fan 90 can dissipate the heat generated from the interface card 80. Furthermore, when the right side of the fixing device 1 (as the corresponding position of FIG. 1) contains another heat generating device (such as a hard disc drive), the fan 90 can also remove the heat produced by the heat generating device.

Figure 3:
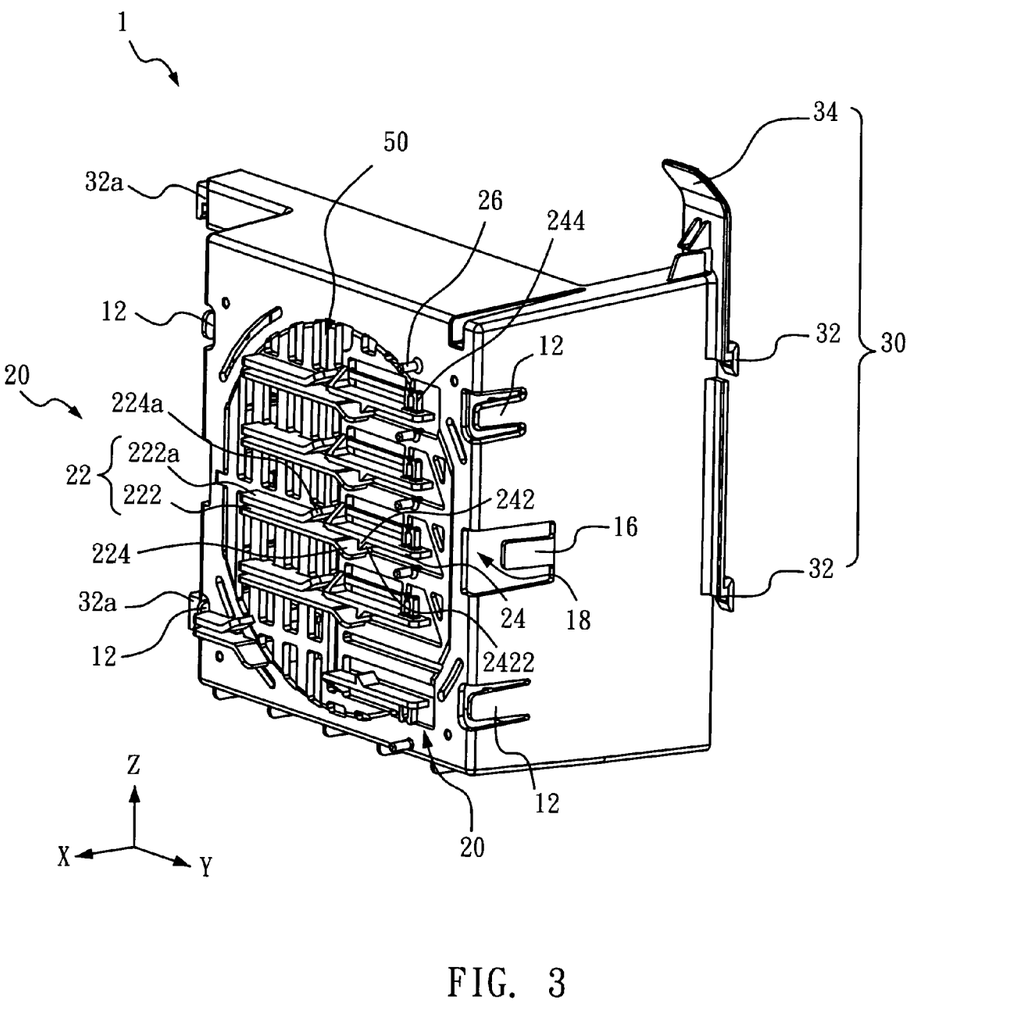
FIG. 3 is a three-dimensional view of a fixing device of the invention.
Figure 4:
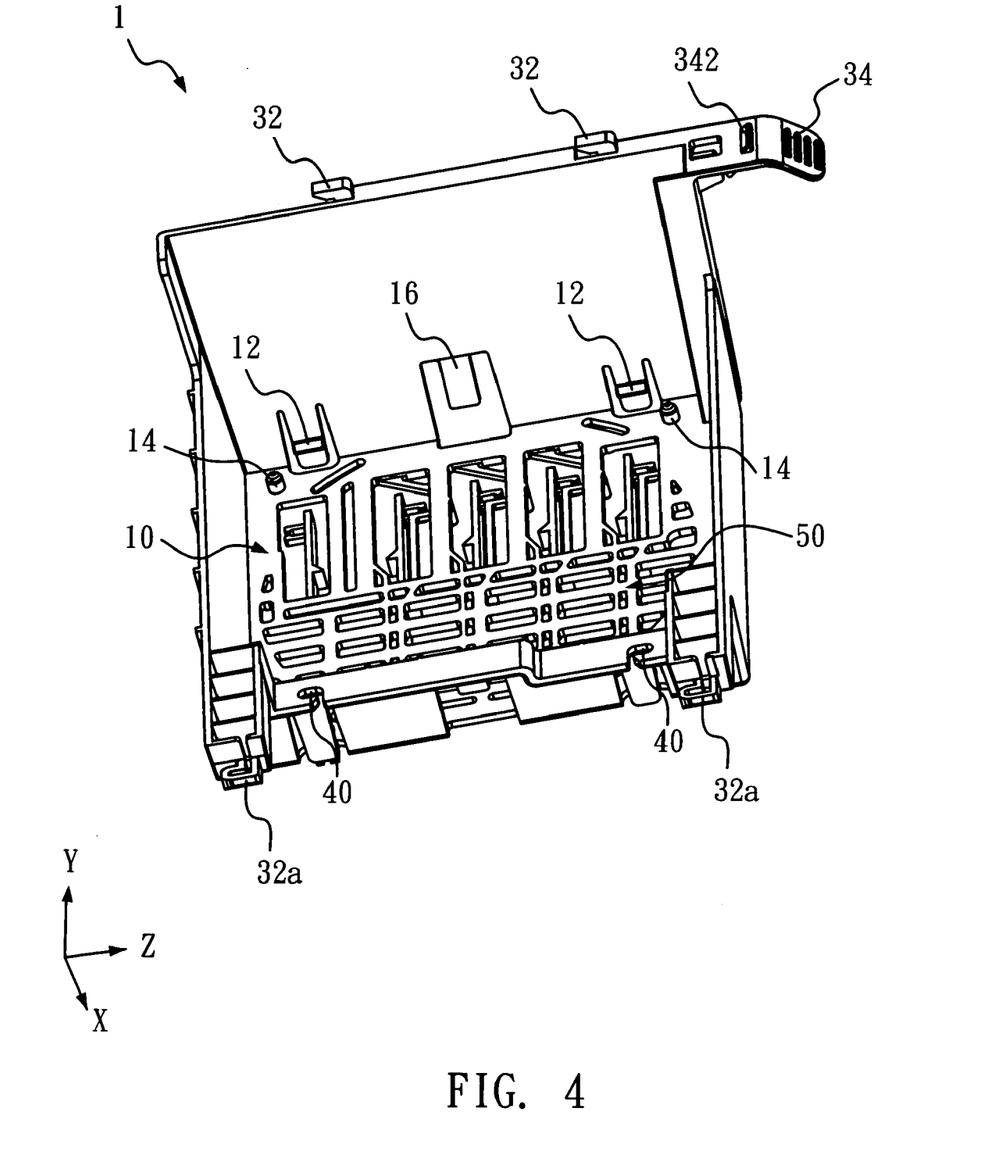
FIG. 4 is a three-dimensional view of a fixing device of the invention in another visual angle.

Please refer to FIG. 3 and FIG. 4 of the embodiment of the fixing device of the invention. FIG. 3 is a three-dimensional view of the invention. FIG. 4 is a three-dimensional view of the invention from another visual angle. In this embodiment, the fixing device 1 is integrated. It can be manufactured by plastic ejection molding.

The fixing device 1 comprises a fan containing portion 10, at least one interface card fixing element 20, and a case fixing element 30, which are used for connecting the fan 90, the interface card 80, and the case 70, respectively. Following is detailed description of each component.

The fan containing portion 10 is used for containing the fan 90. To ensure that the fan 90 is held in the fan containing portion 10 firmly, the fan containing portion 10 comprises a plurality of hooks 12, a plurality of positioning posts 14, and a plurality of pressing pieces 16 wherein the hook 12 is used for connecting to the outer edge of the fan 90 so that the fan can be contained and positioned in the fixing device 1. Because the hook 12 is elastic, it can also provide a tightening strength applied to the fan 90 simultaneously. In this embodiment, there are four hooks 12, and they connect to the four corner positions of the fan 90 individually.

Figure 5:
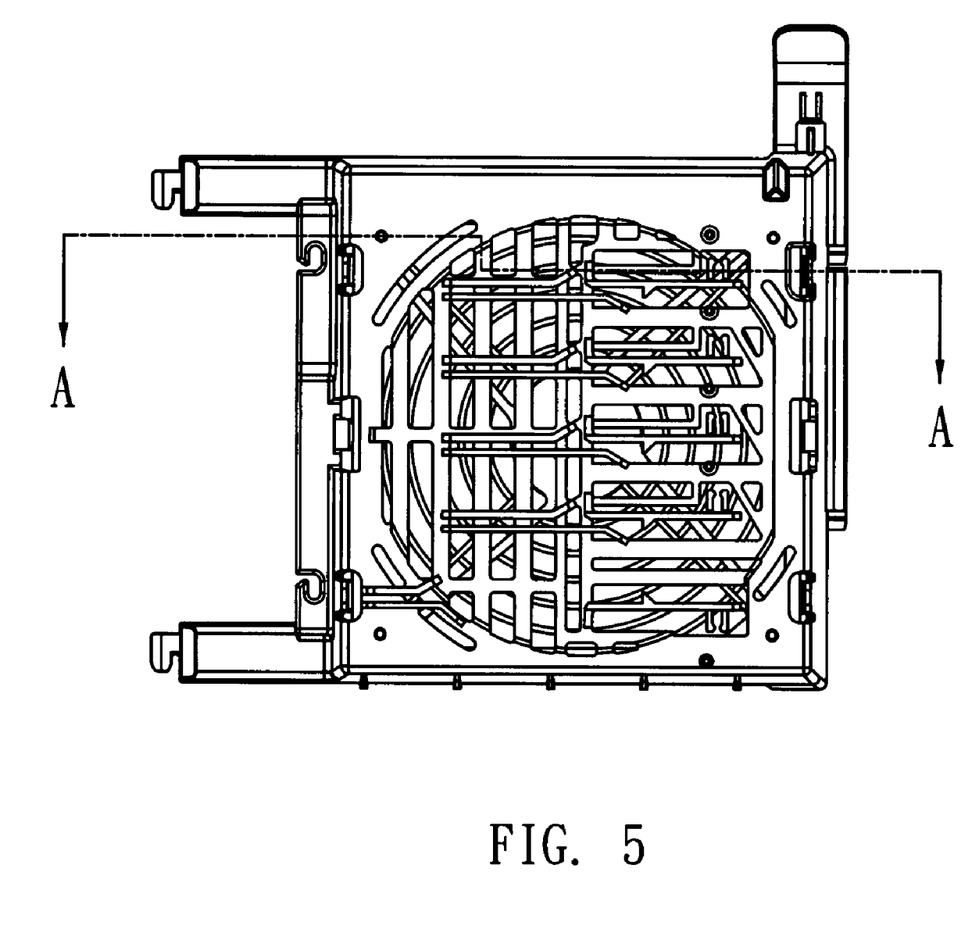
FIG. 5 is a top view of a fan connected to a fixing device.
Figure 6:
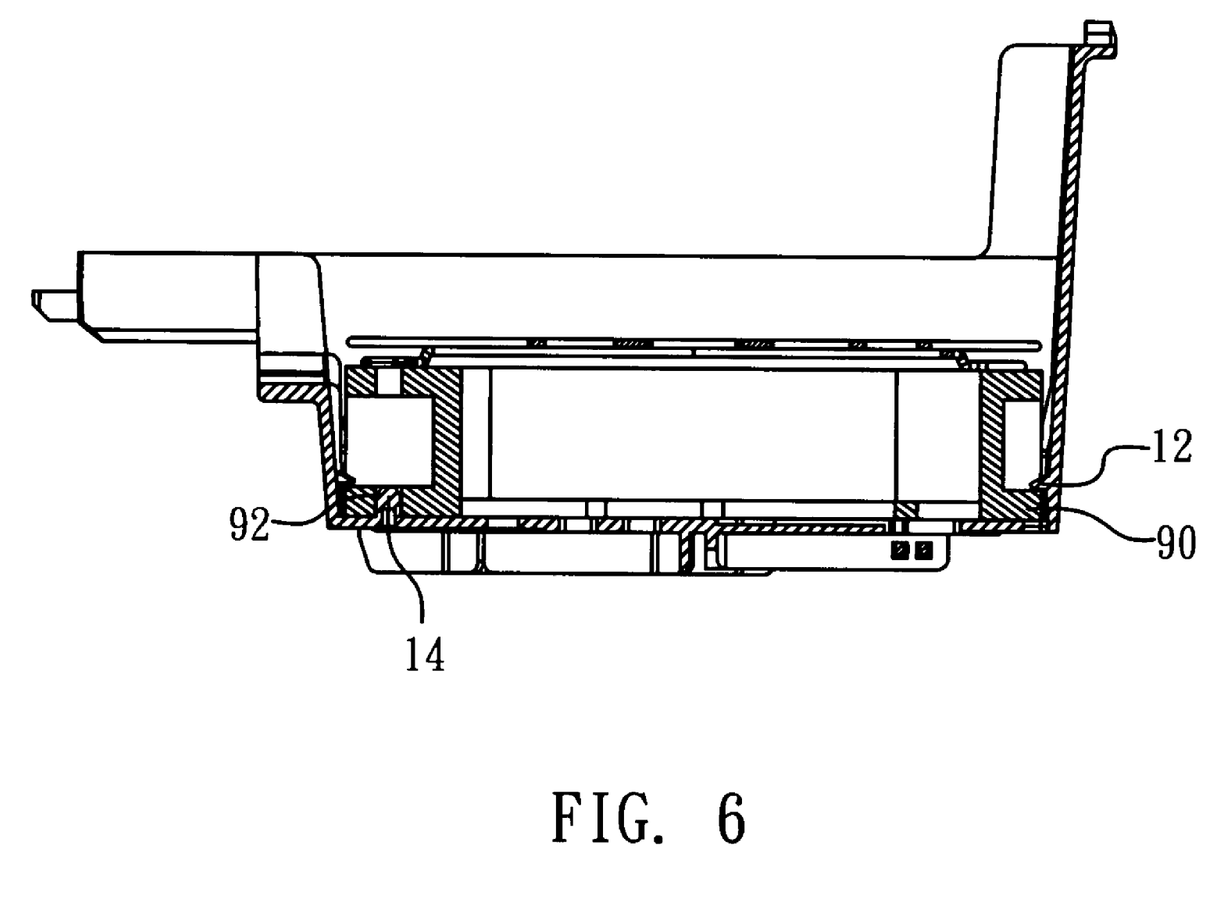
FIG. 6 is a cross section drawing along the A-A line of FIG. 5.

Please refer to FIG. 2, FIG. 5, and FIG. 6 together. FIG. 5 is a top view when a fan is connected to a fixing device. FIG. 6 is a cross section drawing along the A-A line of FIG. 5. The four corner positions of the common fan 90 are recessed (as shown in FIG. 2), so the fastening portion 94 can be applied to the hooks 12 to fasten. Although fans are manufactured in different thicknesses, the fastening portion 94 usually has the same thickness. By making use of this characteristic, the hooks 12 can be applied to fans of different thicknesses.

It needs to be noted that the number of the hooks 12 is not limited in the above description. Furthermore, when the thickness of the fan 90 is constant, the hooks 12 can also connect to the whole thickness of the fan rather than the fastening portion 94.

Please refer to FIG. 4, FIG. 5 and FIG. 6 together. The plurality of positioning posts 14 match the screw holes 14 of the fan 90. The raised portions of the positioning posts 14 can be contained in the screw hole 92 to position the fan.

The limiting direction of the plurality of posts 14 is essentially vertical to the limitation direction of the plurality of hooks 12. In further description, the hooks 12 limit the fan 90 moving along the X axis direction in FIG. 4, and the positioning posts 14 limit the fan 90 moving along the Y and Z axis directions in FIG. 4. By double positioning of the hooks 12 and the positioning posts 14 of the fan containing portion 10, the fan 90 can be contained in the fixing device 1 more stably.

In order to increase the fastening effect of the fan 90 being contained in the fixing device 1, in this embodiment of the invention, the fan containing portion 10 comprises two pressing pieces 16. The pressing pieces 16 are used for fastening the fan 90 further. When the fan 90 is put in the fixing element 10 initially without touching the hooks 12, it can be positioned roughly by the pressing pieces 16.

The hole 18 formed around the pressing piece 16 is helpful to a user taking out the fan 90 positioned in the fixing device 1. In further description, when a user wants to take out the fan 90 positioned in the fixing device 1, the hooks 12 of one side (as shown as two hooks 12 in the right side of FIG. 3) of the fixing device 1 pull out simultaneously (as shown in the Y axis of FIG. 3). When the user pulls the hooks 12, the fingers of the user are inserted in the hole 18 and touch the edge of the fan 90. With application of force following the shape in the position of the hole 18, the user can take out the fan 90 easily.

It needs to be noted that the number and position of the positioning posts 14 and the pressing pieces 16 are not limited in the above description. For instance, when the positioning and force of the hooks 12 already meet the demand, the plurality of positioning posts 14 and/or pressing pieces 16 can be decreased in number or omitted entirely.

Figure 7:
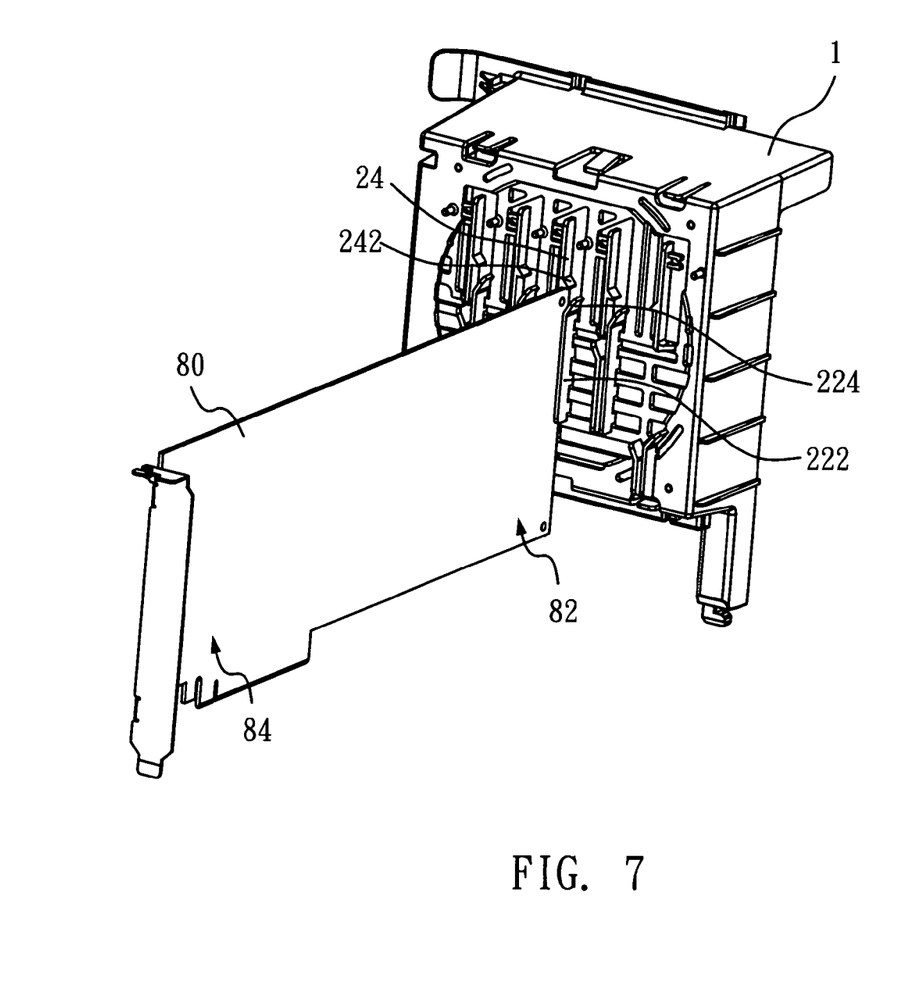
FIG. 7 is a schematic drawing of an interface card connected to a fixing device.

Please refer to FIG. 3 and FIG. 7. FIG. 7 is a schematic drawing of an interface card connected to a fixing device. Each interface card fixing element 20 comprises a first guiding portion 222, a second guiding portion 222a, and a pressing element 24 wherein the first guiding portion 222 and the second guiding portion 222a form a guiding slot 22. The guiding slot 22 is designed for the interface card to slide into it. The guiding slot 22 and the pressing element 24 can hold the interface card 80. In this embodiment of the invention, one side 82 of the interface card 80 can be contained just between the first guiding portion 222 and the second guiding portion 222a.

Because the interval between the first guiding portion 222 and the second guiding portion 222a is narrow, for the interface card 80 to be contained in the guiding slot 22 in a sliding way, the end portion of the first guiding portion 222 comprises a first non-parallel portion 224, and the other end of the second guiding portion 222a comprises a second non-parallel portion 224a. When the user wants to install the interface card 80, even if the directions of insertion of the interface card 80 and the guiding slot 22 are slightly angled, the interface card 80 is guided into the guiding slot 22 smoothly by the guiding effect of the first non-parallel portion 224 and the second non-parallel portion 224a. In this embodiment of the invention, the first non-parallel portion 224 and the second non-parallel portion 224a are in the positional relation of interlacing front and rear. Therefore, when the interface card 80 is put into the guiding slot 22, it is guided by the first non-parallel portion 224 and the second non-parallel portion 224a sequentially, i.e. the interface card 80 is put into the guiding slot 22 in two steps.

It needs to be noted that the first non-parallel portion and the second non-parallel portion can be in a V shape of the relative position. At this time, the interface card 80 that is put in the slot is guided by both the first non-parallel portion and the second non-parallel portion. That is, the guiding direction of the interface card 80 is put into the guiding slot in one step. In addition, the second guiding portion 222a cannot comprise the second non-parallel portion 224a by all means. The second guiding portion 222a can be connected to the pressing element 24. At this time, the interface card 80 being put into the guiding slot is guided in direction only by the first non-parallel portion 224. In this embodiment of the invention, the pressing element 24 is an elastic body capable of being pulled, and the pressing element 24 and the other part of the fixing device 1 are formed in one unity. The pressing element 24 comprises a raised portion 242 and a first wedging portion 244. When one side 82 of the interface card 80 is in the guiding slot 22, the raised portion 242 can press against the edge of the interface card 80 (as shown in FIG. 7).

Each of the interface card fixing elements 20 comprises a second wedging portion 26, and its shape matches the first wedging portion 244. By fixing the first wedging portion 244 in the second wedging portion 26, the raised portion 242 is distant from the interface card 80, so the interface card 80 can be contained in the guiding slot 22. In this embodiment of the invention, the first wedging portion 244 is an elastic clip portion, and the second wedging portion 26 is a pillar portion for fixing the first wedging portion 244. The first wedging portion 244 and the second wedging portion 26 have two functions. The original position of the raised portion 242 of the pressing element 24 blocks the path of the guiding slot 22. When the user bends the pressing element 24 and makes the first wedging portion 244 connect to the second wedging portion 26, the interface card 80 slides into the guiding slot 22 without being blocked because of the raised portion 242. In addition, the second wedging portion 26 limits the maximum deformation of the pressing element 24 to prevent damage.

It needs to be noted that the first wedging portion and the second wedging portion can be other fixing structures matching each other. For example, the first wedging portion and the second wedging portion can be a matching tenon, a sunken and raised structure, a snap lock, etc.

Please refer to FIG. 3. In this embodiment of the invention, the number of the interface fixing elements 20 is five. That is, a single fixing device 1 can be applied for fixing at most five interface cards 80 wherein the disposition of the interface card fixing element 20 of the lower portion of FIG. 3 is slightly different from the other four interface card fixing elements 20. Because it is near the edge 76 of the case 70 (Please refer to FIG. 1), the disposition of the interface card 20 changes for a user to operate the pressing element 24 conveniently, It needs to be noted that the number and the disposition of the interface card fixing elements 20 are not limited in the above description.

In this embodiment of the invention, the raised portion 242 has an inclined plane 2422 (as shown in FIG. 3), so the pressing element 24 does not need to be bent in advance; the interface card 80 presses against the inclined plane 2422 directly. When force is applied continuously, the pressing element 24 is bent, and then the interface card 80 can slide into the guiding slot 22. At this time, the first wedging portion 244 and the second wedging portion 26 are unnecessary. It needs to be noted that if the user wants to remove the interface card 80, the user still has to bend the pressing element 24 in advance so that the raised portion 242 will depart from the position of pressing the interface card 80 in order to take out the interface card 80 smoothly.

It also needs to be noted that the pressing element cannot be necessarily a structure in one unity; that is, it must be a separate structure. At this time, the pressing element can be a non-elastic body. The individual pressing element comprises a first connecting element, and the interface card fixing element comprises a second connecting element. The position and the structure of the first connecting element and the second connecting element match each other. The individual pressing element connects to the interface card fixing element by the first connecting element connecting to the second connecting element. For example, the first connecting element and the second connecting element can be a matching tenon, a sunken and raised structure, a snap lock, and so on. At this time, the user can put the interface card 80 in the guiding slot 22 in advance, and then the individual pressing element connects to the interface card fixing element to fix the interface card. If the user wants to remove the interface card 80, the pressing element needs to be removed in advance, and then the interface card 80 can be removed smoothly.

Please refer to FIG. 4. The fixing device 1 can be connected to the case 70 with the case fixing element 30. The case fixing element 30 comprises a plurality of fixing units 32, 32a and a handle 34 wherein the handle 34 comprises a positioning portion 342. The shape and the position of each of the fixing units 32, 32a match the fixing holes 72 of the case, and the shape and the position of the positioning portion 342 match the fixing aperture 74 of the case. In this embodiment of the invention, the fixing units 32, 32a are hooks, and the number of the fixing units is four, so the number of the fixing holes 72 is also four. In this embodiment of the invention, in order to match the position of the fixing aperture 74 of the case 70, the corresponding positions of the fixing unit 32 and the fixing unit 32a are vertical (as shown in FIG. 4). The limit direction of the fixing unit 32 and the fixing unit 32a is the same. By four fixing units 32, 32a connecting to the corresponding four fixing holes 72, and the positioning portion 342 connecting to the fixing aperture 74, the fixing device 1 connects to the case 70.

The limit direction of the positioning portion 342 of the handle 34 is essentially perpendicular to the limit direction of the fixing unit 32, 32a. In further description, the fixing unit 32, 32a limits the fixing device 1 moving along the direction of the X axis and Y axis, as shown in FIG. 4, and the position portion 342 limits the fixing device 1 moving along the Z axis.

By double positioning of the hooks 32, 32a and the positioning portion 342 of the case fixing element 30, the fixing device can be connected to the case 70 more solidly.

It needs to be noted that the number and the position of the fixing units 32, 32a is not limited, nor is the way that the case fixing element 30 connects to the case 70 limited. For example, the case fixing element 30 can also connect to the case 70 by wedging (using tenons, for instance) or screwing (using screws, for instance), etc.

In this embodiment of the invention, in order to strengthen the structure of the fixing device 1, at least one portion of the airing portion 50 of the fixing device 1 is crossed (X-shaped, for instance) so that the fixing device still has good structural strength in the situation of the airing portion 50 having a high open hole ratio.

Furthermore, the fixing device 1 comprises a wire containing portion 40 (please refer to FIG. 4). It is used for containing and guiding the wires (not shown in the figure) of the fan 90. It needs to be noted that the use of a wire containing portion 40 depends on the actual situation. Otherwise, it can be omitted.

The following description is a depiction of the fixing device 1 in practical use. Please refer to FIG. 2 and FIG. 4 together. First, the fan 90 is contained in the fixing device 1. Due to the hook 12 of the fan containing portion 10, positioning pillar 14, and the pressing piece 16 fixing the fan 90, the fixing device 1 and the fan 90 cannot move in relation to each other.

Figure 8:
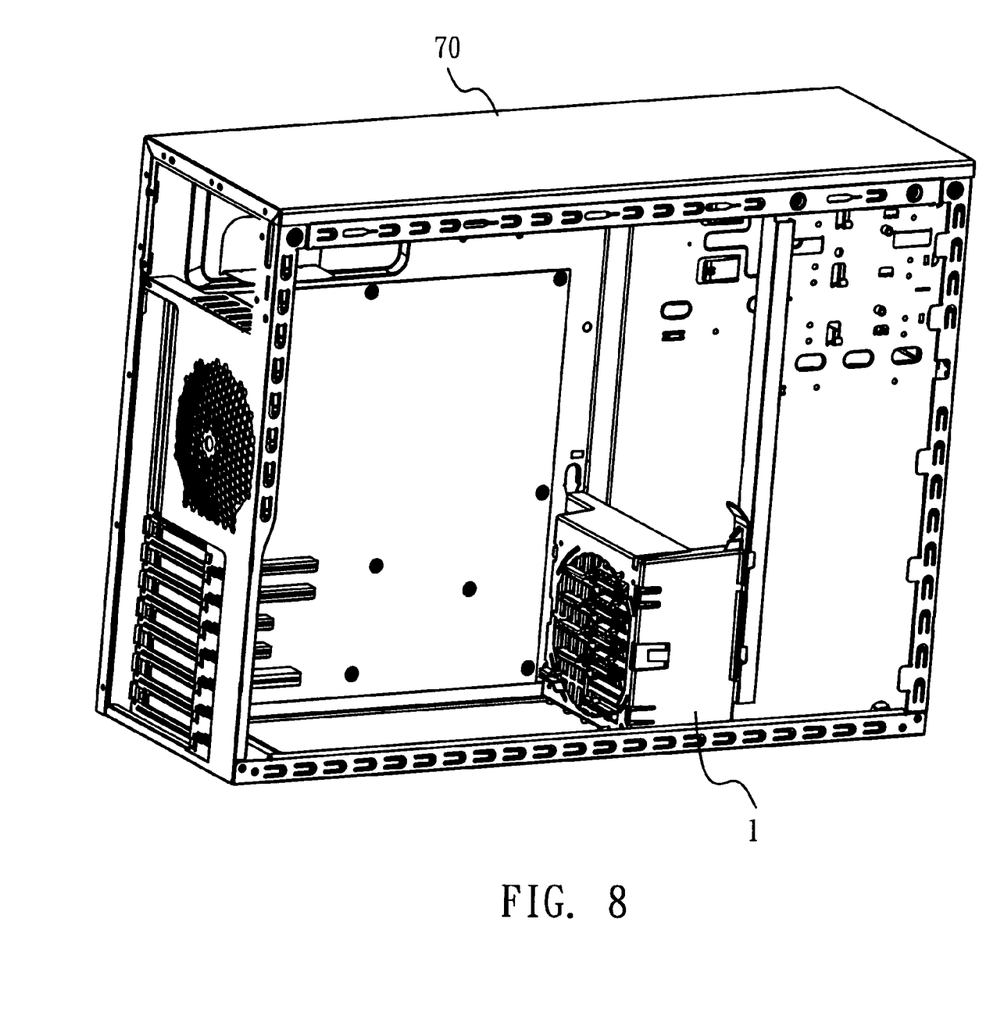
FIG. 8 is a three-dimensional view of a fixing device connected to a case.

Next, the four fixing units 32, 32a of the case fixing element 30 are aligned with and put into the fixing hole 72 of the case 70. Then the positioning portion 342 of the handle 34 wedges the fixing aperture 74 such that the fixing device, which already contains the fan 90, connects to the case 70 (as shown in FIG. 8).

Figure 9:
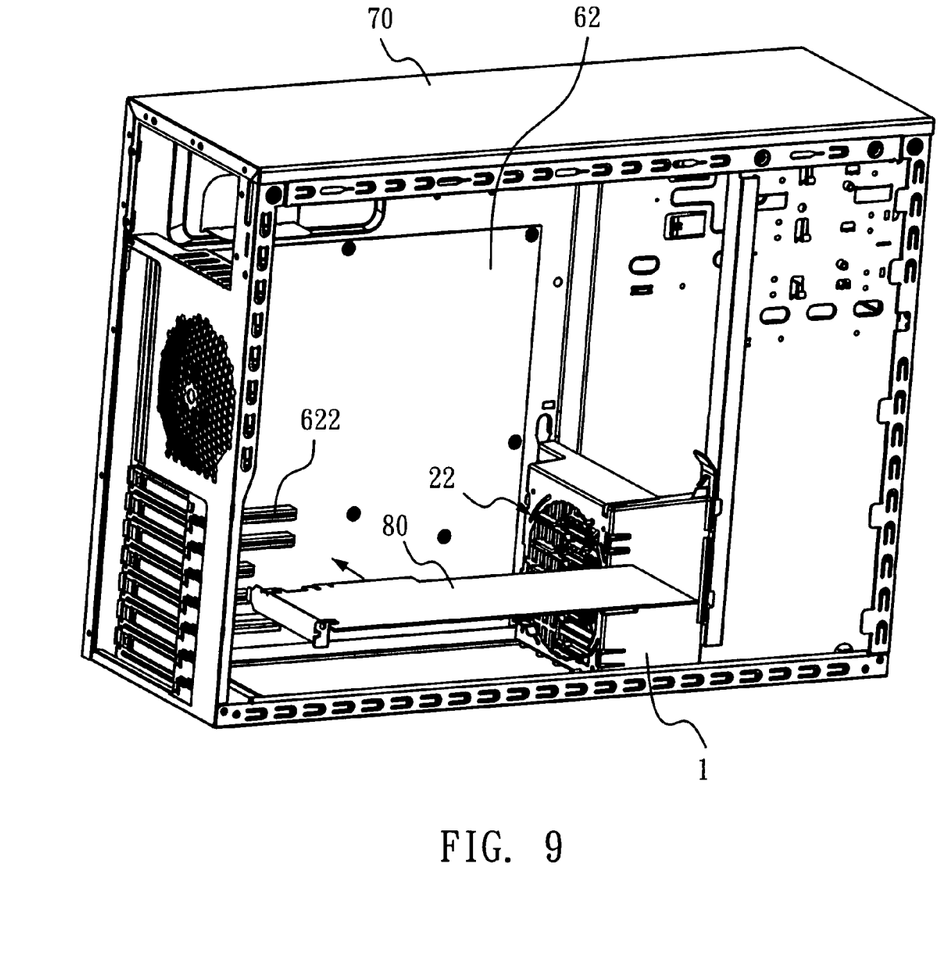
FIG. 9 is a three-dimensional view when an interface card is installed.
Figure 10:
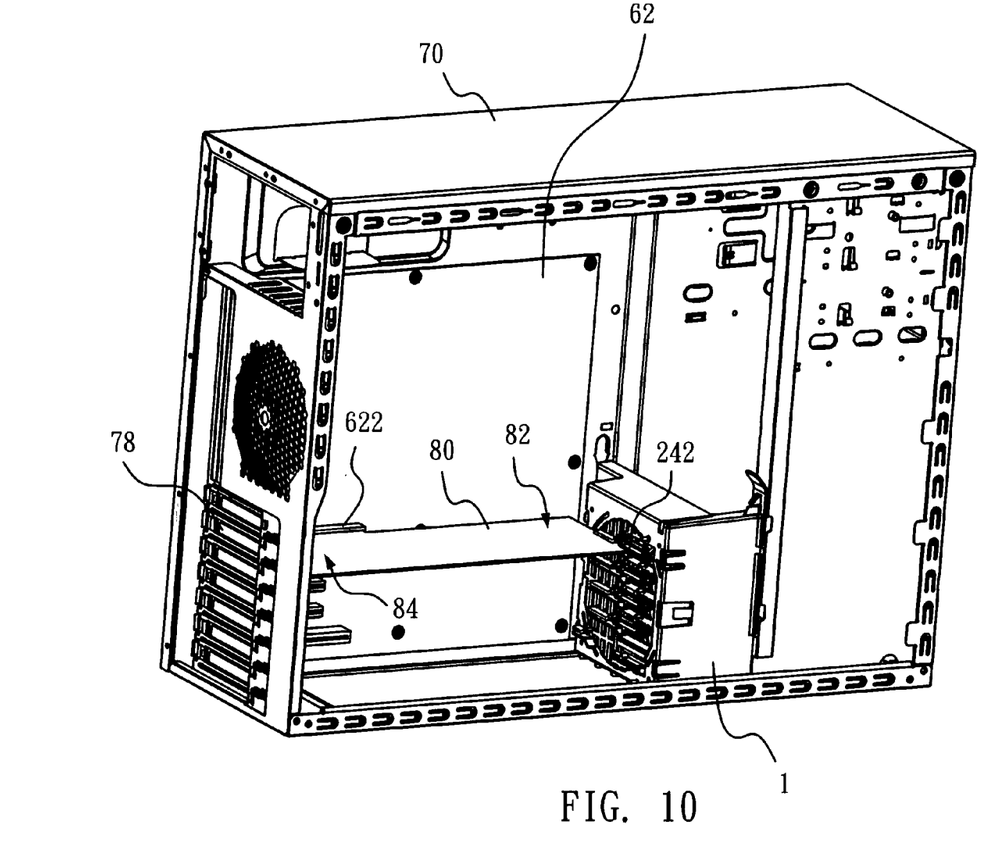
FIG. 10 is a three-dimensional view of the completed installation of an interface card.

Then the user bends the pressing element 24 to make the first wedging portion 244 connect to the second wedging portion 26. The user can take the interface card 80 and slide it into the guiding slot 22 along the direction of the first guiding portion 222 (as shown by the arrow in FIG. 9). Last, the pressing element 24 is bent to its original shape, so the edge of one side 82 of the interface card 80 presses against the raised portion 242 (as shown in FIG. 7 and FIG. 10). Another side 84 of the interface card 80 connects to the opening 78 of the case 70 (as shown in FIG. 10). At this time, the interface card also connects to the slot 622 of the main board 62, thus the installation operation is complete.

For a brief description, the fixing device of the invention has the structure in one unity. It does need other mating parts (such as an iron element, screws etc.) to connect the fan and the interface card to the fixing device, and the fixing device can connect to the case. It has the characteristics of small volume, simple structure, and quick and easy installation and removal, so it resolves the problem of the prior art.

Although the present invention has been explained in relation to its preferred embodiment, it is to be understood that many other possible modifications and variations can be made without departing from the spirit and scope of the invention as hereinafter claimed.

What is claimed is:

1. A fixing device capable of connecting at least one interface card and containing a fan, the fixing device comprising:

a fan containing portion containing the fan; and at least one interface card fixing element connected to the fan containing portion, wherein each of the at least one interface card fixing elements comprises:

a first guiding portion;

a second guiding portion, the first guiding portion and the second guiding portion forming a guiding slot for the interface card sliding into the guiding slot, wherein a length of the first guiding portion and a length of the second guiding portion are not the same; and a pressing element capable of pressing the interface card.

2. The fixing device as claimed in claim 1, wherein the fan containing portion comprises a plurality of hooks used for connecting to the fan.

3. The fixing device as claimed in claim 2, wherein the fan containing portion comprises a plurality of positioning posts, the limiting direction of the plurality of positioning posts being essentially perpendicular to the limiting direction of the plurality of hooks, and the plurality of positioning posts being positioned at a plurality of screw holes of the fan.

4. The fixing device as claimed in claim 1, wherein the fan containing portion comprises a plurality of pressing pieces being used for fastening the fan.

5. The fixing device as claimed in claim 1, wherein the first guiding portion comprises a first non-parallel portion which is non-parallel to the first guiding portion, the first non-parallel portion being used for guiding the interface card into the guiding slot.

6. The fixing device as claimed in claim 5, wherein the second guiding portion comprises a second non-parallel portion which is non-parallel to the second guiding portion.

7. The fixing device as claimed in claim 5, wherein the second guiding portion comprises a second non-parallel portion which is non-parallel to the second guiding portion, and the first non-parallel portion and the second non-parallel portion are in the positional relation of a V shape.

8. The fixing device as claimed in claim 5, wherein the second guiding portion is connected to the pressing element.

9. The fixing device as claimed in claim 5, wherein the pressing-element comprises a raised portion, the edge of the interface card being pressed by the raised portion.

10. The fixing device as claimed in claim 9, wherein the raised portion comprises an inclined plane.

11. The fixing device as claimed in claim 9, wherein the pressing element comprises a first wedging portion, the interface card fixing element comprises a second wedging portion, with the first wedging portion fixing the second wedging portion, the raised portion being distant from the interface card such that the interface card can be contained in the guiding slot.

12. The fixing device as claimed in claim 11, wherein the fixing device is formed as one unit by plastic ejection molding, and the at least one interface card is a peripheral component interconnect (PCI) card.

13. The fixing device as claimed in claim 1, wherein the at least one interface card is located on the two opposite sides of the fixing device.

14. The fixing device as claimed in claim 1, wherein the pressing element is separable from the fixing device.

15. A computer comprising:
a case;
a fixing device being connected to the case;
an interface card, one side of the interface card being connected to the fixing device, and another side being connected to the case; and
a fan being contained in the fixing device;
wherein the fixing device comprises:
a fan containing portion containing the fan; and
at least one interface card fixing element connected to the fan containing portion, wherein each of the at least one interface card fixing elements comprises:
a first guiding portion;
a second guiding portion, the first guiding portion and the second guiding portion forming a guiding slot for the interface card sliding into the guiding slot, wherein a length of the first guiding portion and a length of the second guiding portion are not the same; and
a pressing element capable of pressing against the interface card.

16. The computer as claimed in claim 15, wherein the fan containing portion comprises a plurality of hooks used for connecting to the fan.

17. The computer as claimed in claim 16, wherein the fan containing portion comprises a plurality of positioning posts, the limiting direction of the plurality of positioning posts being essentially perpendicular to the limiting direction of the plurality of hooks, and the plurality of positioning posts being positioned at a plurality of screw holes of the fan.

18. The computer as claimed in claim 15, wherein the fixing device comprises a case fixing element, the case fixing element comprising a plurality of fixing units, the fixing device connecting to the case by the plurality of fixing units.

19. The computer as claimed in claim 15, wherein the fan containing portion comprises a plurality of pressing pieces used for fastening the fan.

20. The computer as claimed in claim 15, wherein the first guiding portion comprises a first non-parallel portion which is non-parallel to the first guiding portion, the first non-parallel portion being used for guiding the interface card into the guiding slot.

21. The computer as claimed in claim 20, wherein the second guiding portion comprises a second non-parallel portion which is non-parallel to the second guiding portion.

22. The computer as claimed in claim 20, wherein the second guiding portion comprises a second non-parallel portion which is non-parallel to the second guiding portion, and the first non-parallel portion and the second non-parallel portion are in the positional relation of a V shape.

23. The computer as claimed in claim 20, wherein the second guiding portion is connected to the pressing element.

24. The computer as claimed in claim 20, wherein the pressing element comprises a raised portion, the edge of the interface card being pressed by the raised portion.

25. The computer as claimed in claim 24, wherein the raised portion comprises an inclined plane.

26. The computer as claimed in claim 24, wherein the pressing element comprises a first wedging portion, the interface card fixing element comprising a second wedging portion; the first wedging portion fixes the second wedging portion, the raised portion being distant from the interface card such that the interface card can be contained in the guiding slot.

27. The computer as claimed in claim 26, wherein the fixing device is formed as one unit by plastic ejection molding, and the interface card is a peripheral component interconnect (PCI) card.

28. The computer as claimed in claim 15, wherein the at least one interface card is located on the two opposite sides of the fixing device.

29. The computer as claimed in claim 15, wherein the pressing element is separable from the fixing device.

30. The fixing device as claimed in claim 1, wherein the fan containing portion has a concave shape such that the fan containing portion covers five sides of the fan.

31. The fixing device as claimed in claim 1, wherein the fan containing portion and the at least one interface card fixing element are formed as a unibody.

32. The computer as claimed in claim 15, wherein the fan containing portion has a concave shape such that the fan containing portion covers five sides of the fan.

33. The computer as claimed in claim 15, wherein the fan containing portion and the at least one interface card fixing element are formed as a unibody.

* * * * *